United States Patent [19]

Chiu et al.

[11] Patent Number: 4,530,119

[45] Date of Patent: Jul. 23, 1985

[54] FLUSHING CONTROLLER FOR TOILET

[76] Inventors: Huan-Juei Chiu; Ming-Sheng Chiu, both of P.O. Box 10160, both of Taipei, Taiwan

[21] Appl. No.: 518,828

[22] Filed: Aug. 1, 1983

[51] Int. Cl.³ ............................ E03D 1/14; E03D 3/12
[52] U.S. Cl. ........................................... 4/324; 4/325; 4/249; 4/415
[58] Field of Search ................. 4/324, 325, 326, 249, 4/407, 415, 413, 405, 360, 387, 410, 395, 394, 378

[56] References Cited

U.S. PATENT DOCUMENTS

| | | | |
|---|---|---|---|
| 2,532,977 | 12/1950 | White | 4/325 |
| 3,487,476 | 1/1970 | Stiern et al. | 4/326 |
| 3,795,016 | 3/1974 | Eastman | 4/326 |
| 3,988,786 | 11/1976 | Lahfeldt | 4/249 |
| 3,994,029 | 11/1976 | Badders | 4/407 |
| 4,406,024 | 9/1983 | Chiu et al. | 4/324 |
| 4,411,029 | 10/1983 | Huang | 4/324 |

*Primary Examiner*—Henry K. Artis

[57] ABSTRACT

A flushing controller for a toilet which includes a variable flushing actuator, a pre-set flushing actuator, a fixed bush and a vertically adjusted float wherein the float can be freely and continuously adjusted for saving water resources when operating the pre-set flushing actuator.

2 Claims, 3 Drawing Figures

FLUSHING CONTROLLER FOR TOILET

BACKGROUND OF THE INVENTION

U.S. patent application of Ser. No. 06/365,833 filed by the present inventor on Apr. 5, 1982 was allowed on June 23, 1983, which still has the defect to require a pivotting means to pivotedly fix a float-actuated control lever on the pivotting means whereby the installation of such a flushing controller on a toilet tank will become difficult for a user especially for a housewife and the production cost will also be increased.

The present inventor has found this defect and invented the present improved flushing controller for a toilet.

SUMMARY OF THE INVENTION

The object of the present invention is to provide a flushing controller for toilet which comprises a variable flushing actuator, a pre-set flushing actuator, a fixed bushing and a vertically adjusted float so that the float can be freely adjusted to control the volume of flushing water for saving water resource when operating the pre-set flushing actuator for flushing stools.

DETAILED DESCRIPTION

Figure 1:
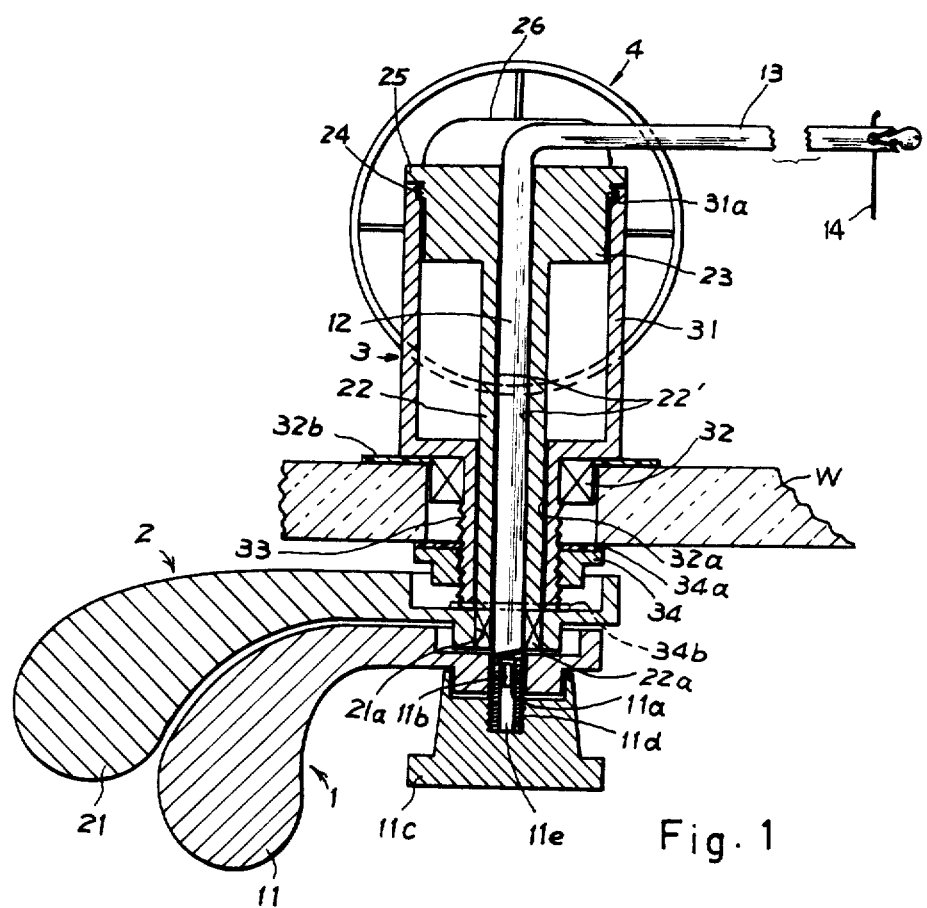
FIG. 1 is a top-view sectional drawing of the present invention.
Figure 2:
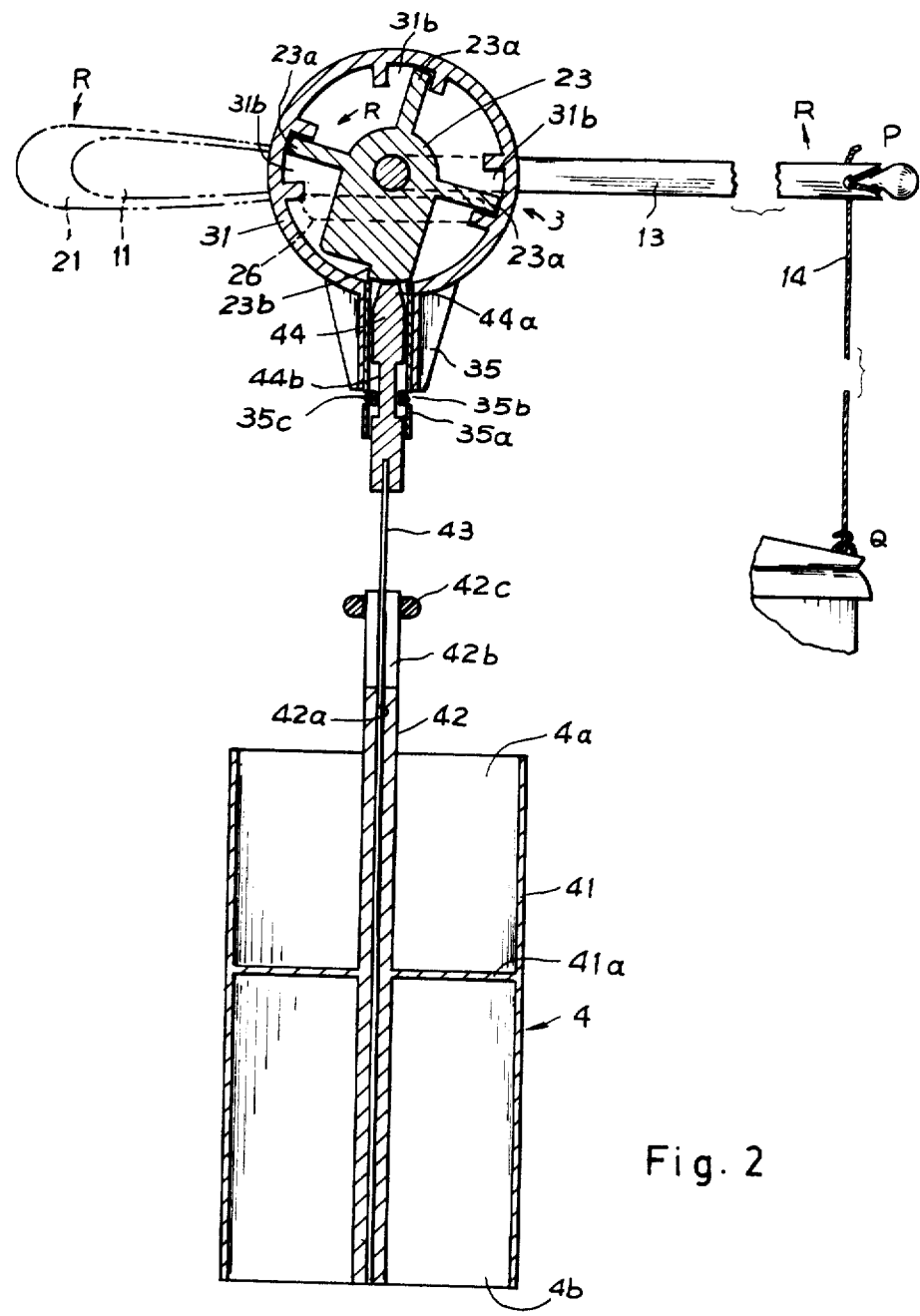
FIG. 2 is a front-view sectional drawing of the present invention.
Figure 3:
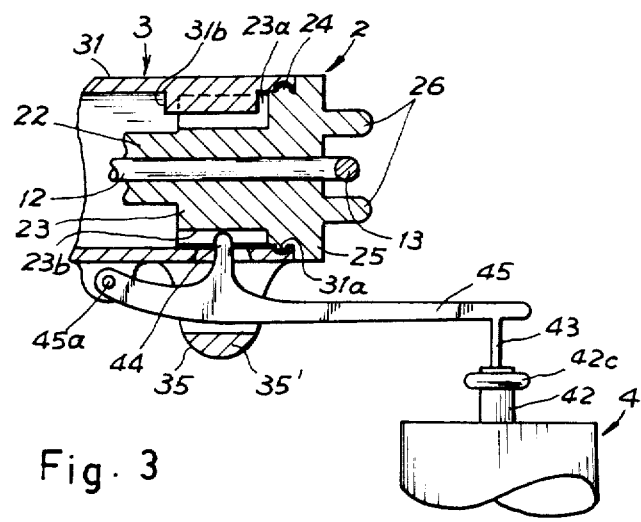
FIG. 3 is an illustration of another preferred embodiment of the present invention.

As shown in FIGS. 1 and 2, the present invention comprises: a variable flushing actuator 1, a pre-set flushing actuator 2, a fixed bushing 3 and a vertically-adjusted float 4.

Variable flushing actuator 1 comprises a handle 11, a spindle 12 connected with handle 11, and a lever 13 connected with toilet flush valve by a wire 14. Handle 11 is centrally formed with a circular hole 11a and fit with a flat plate 11b. Spindle 12 is terminated by a threaded portion 11d which is formed with a groove 11e to engage with flat plate 11b of handle 11 and is then capped by a knob 11c. The length of wire 14 is designed so that when the acutators 1,2 are depressed to straightly pull the wire, the flush valve can be fully opened.

Pre-set flushing actuator 2 comprises: a handle 21, a spindle 22, a float engaging means 23, an extension ring 24 formed on the rear end of engaging means 23 and rotatably fixed in fixed bushing 3, a bushing cover 25 rotatably sealing hollow cylinder 31 of bushing bush 3 and a rest plate 26 extending from cover 25 to biase lever 13 when depressing handle 21. Handle 21 is centrally formed with a square hole 21a for fixing the square head 22a of spindle 22.

A lengthy hole 22' is centrally formed inside spindle 22 for freely inserting spindle 12 of variable flushing actuator 1. Float engaging means 23 is formed on the rear portion of pre-set flushing actuator 2 which is formed with three upper extensions 23a and a lower extension 23b respectively extending from the central spindle 22, each extension being separated in equal radians. The lower extension 23b formed on the lowest portion is cut with a recess to engage with the float lever 43 as FIG. 2 shown.

Fixed bushing 3 comprises a hollow cylinder 31 for rotatably fixing spindles 12, 22. An extension 32 is formed on the front portion of cylinder 31 and is formed with a threaded portion 33 whereby the present invention can be fixed on tank wall w by means of nut 34, packing 32b, packing 34a, and washer 34b. The bushing 3 is formed with a central hole 32a for passing spindle 22. A guide block 35 is formed on the lower portion of bushing 3, which is centrally provided with a hollow pipe 35a for reciprocative motion of a float lever 43 having a lever head 44. Such pipe 35a is cut with a slot 35b for inserting a pin 35c therein to limit the movement of lever head 44 by the neck portion 44b. The lever head 44 is formed with a tapered portion 44a on its top end to engage with recess 23b of float engaging means 23. Three grooves 31b are formed inside cylinder 31 to limit the rotation of extensions 23a formed on float engaging means 23.

Vertically adjusted float 4 comprises a hollow cylinder 41 which is partitioned traversely by a diaphragm plate 41a to form an upper chamber 4a and a lower chamber 4b and is centrally longitudinally formed with a central jacket tube 42 for free adjustment of float lever 43 which is freely jacketed in tube 42 and can be fixed on jacket tube 42 by fastening a belt 42c on groove 42b.

Whenever using the present invention, the variable flushing actuator 1 may be actuated to suitably open the toilet flush valve for small volume flushing such as urine. If for larger flushing such as for stools, the pre-set flushing actuator 2 is actuated to open the toilet flush valve and once the handle 21 is depressed, the float engaging means 23 will be rotated in direction R as shown in FIG. 2 and the recess 23b will be engaged with float lever 43 so that the buoyancy of float 4 will lock the pre-set flushing actuator 2 to open the toilet valve until the water lever drops under the float 4 whereby the float weight will voluntarily fall to unlock the flushing actuator 2 so as to close the flush valve and the water is refilled into toilet tank for next use. The float 4 may be freely adjusted along the lever 43 to save water resource. For example, the higher the float is, less water will be drained when opening toilet valve. Naturally, when adjusting the float height, the minimum water required for efficiently cleaning toilet bowl should be considered. In the present invention, the upper chamber 4a of float 4 serves as weight as filled water for quicker drop when not backed by water buoyancy. The lower chamber 4b accumulated with air naturally becomes a float. Both chambers are not covered.

The float 4 of the present invention may be made as a closed hollow cylinder and the lever 43 be made in a heavier diameter or in larger weight so as to facilitate the drop of float when bearing no water buoyancy.

The present invention has the following advantages superior to conventional toilets:

1. The constructed parts are simple for easier installation either for new toilet or for renewing the old toilet.

2. The production cost can be greatly reduced for wider applications.

3. Maintenance problems will be reduced as minimum as possible as the simple construction thereof.

We claim:

1. An improved flushing controller for a toilet comprising:

a variable flushing actuator extending inwards a spindle which is connected with a lever to pull toilet flush valve by a wire;

a pre-set flushing actuator having spindle formed with a central hole to freely insert said spindle of said variable flushing actuator;

a fixed bushing forming with a hollow cylinder for rotatably fixing said two spindles of said variable flushing actuator and said pre-set flushing actuator on a toilet tank wall; and a vertically adjusted float formed under said fixed bushing, the improvement which comprises:

said pre-set flushing actuator formed with a float engaging means which is formed with three upper extensions and a lower extension, respectively extending from said spindle of said pre-set flushing actuator and separated in equal radians, said lower extension cut with a recess to engage with a float lever;

said pre-set flushing actuator formed with an extension ring formed at the rear end of said float engaging means and rotatably fixed in said fixed bushing, a bushing cover rotatably sealing said hollow cylinder of said bushing, and a rest plate extending from said bushing cover to biase said lever for valve opening;

said fixed bushing formed with a hollow cylinder wherein three grooves are formed inside said hollow cylinder to limit the rotation of said three upper extensions of said float engaging means, and formed with a guide block under said engaging means, a hollow pipe for reciprocative motion of a float lever provided in said guide block; and said vertically adjusted float comprising a hollow cylinder which is partitioned traversely by a diaphragm plate to form an upper chamber filled with water and a lower chamber accumulated with air therein and centrally longitudinally formed with a central tube for free adjustment of said float lever jacketed in said central tube, and a float lever having a lever head which is formed with a tapered portion on its top end to engage with said recess of said float engaging means, whereby said pre-set flushing actuator is depressed to engage said recess of said lower extension with said float lever as backed by float buoyancy and said lever is biased by the rear rest plate to open a toilet flush valve for flushing use.

2. A flushing controller according to claim 1, wherein said float is made as a hollow cylinder to serve as a float and said float lever is made with a larger diameter and heavier weight to serve as a weight.

* * * * *